United States Patent [19]

Sullivan et al.

[11] Patent Number: 5,652,287

[45] Date of Patent: Jul. 29, 1997

[54] DUCTILE POLY(ARYLENE SULFIDE) RESIN COMPOSITIONS

[75] Inventors: Vincent J. Sullivan, Madison; Andrew B. Auerbach, Livingston, both of N.J.

[73] Assignee: Hoechst Celanese Corporation, Somerville, N.J.

[21] Appl. No.: 631,747

[22] Filed: Apr. 10, 1996

Related U.S. Application Data

[63] Continuation of Ser. No. 340,768, Nov. 16, 1994, abandoned, which is a continuation-in-part of Ser. No. 898,634, Jun. 15, 1992, abandoned.

[51] Int. Cl.$^6$ ................................................. C08K 5/24
[52] U.S. Cl. .................. 524/262; 524/268; 524/588; 524/609; 524/500; 525/478; 525/535
[58] Field of Search ........................... 524/262, 268, 524/588, 609, 500; 525/478, 535

[56] References Cited

U.S. PATENT DOCUMENTS

| | | | |
|---|---|---|---|
| 4,581,411 | 4/1986 | Liang et al. | 525/189 |
| 4,743,639 | 5/1988 | Liang et al. | 524/188 |
| 4,797,448 | 1/1989 | Liang | 525/106 |
| 4,849,564 | 7/1989 | Shimizu et al. | 524/114 |
| 4,880,882 | 11/1989 | Morita et al. | 525/446 |
| 5,219,920 | 6/1993 | Yamamoto et al. | 525/478 |

FOREIGN PATENT DOCUMENTS

| | | |
|---|---|---|
| 0 142 825 | 5/1985 | European Pat. Off. |
| 0 369 244 | 5/1990 | European Pat. Off. |
| 0 369 245 | 5/1990 | European Pat. Off. |
| 0 380 108 | 8/1990 | European Pat. Off. |
| 0 382 015 | 8/1990 | European Pat. Off. |

OTHER PUBLICATIONS

White, J.W., Pape, P.G., Romenesko, D.J., Imai, T., and Morita, Y., "New Silicone Modifiers for Improved Physical Properties and Processing of Thermoplastics and Thermoset Resins", SPE ANTEC (1991).

*Primary Examiner*—Mark D. Sweet
*Attorney, Agent, or Firm*—Karen E. Klumas

[57] ABSTRACT

A resin composition which comprises:

(A) from about 99.5 to about 70 percent by weight, based on the total weight of components (A) and (B), of a poly(arylene sulfide) having a melt viscosity of from about 300 to about 8,000 poise at 1,200 sec$^{-1}$ and 310° C.;

(B) from about 0.5 to about 30 percent by weight, based on the total weight of components (A) and (B), of a substantially non-functionalized, emulsion cured silicone rubber which is the condensation product of (i) an organopolysiloxane having at least two active hydrogen functional groups per molecule, and (ii) an organohydrogenpolysiloxane having at least two silicon-bonded hydrogen atoms per molecule, said silicone rubber being melt dispersable with the poly(arylene sulfide); and (C) from about 0.1 to about 2.0 parts by weight, based on 100 parts by weight of components (A), (B) and (C) combined, of an aminosilane, wherein said composition has been prepared by combining components B and C with component A in the absence of a dispersion medium.

21 Claims, No Drawings

DUCTILE POLY(ARYLENE SULFIDE) RESIN COMPOSITIONS

This is a Continuation of application(s) Ser. No. 08/340, 768 filed on Nov. 16, 1994 now abandoned which is a continuation-in-part of application Ser. No. 07/898,634 filed on Jun. 15, 1992, now abandoned.

BACKGROUND OF THE INVENTION

This invention relates to poly(arylene sulfide) resin compositions having improved ductility.

Poly(arylene sulfide) resins are thermoplastic, aromatic polymers having relatively high use temperatures (i.e., typically in excess of 200° C.) as well as good dimensional stability and toughness. Compared to many other thermoplastic resins (e.g., poly(alkylene terephthalate)s, nylons, and polyacetal), poly(arylene sulfide)s possess superior chemical and flame resistance. Owing to the highly crystalline nature of many poly(arylene sulfide)s, their use in applications where ductility is desired typically requires the incorporation of one or more additives such as impact modifiers, plasticizers and/or processing aids. The drawback of many of these additives, for example, olefin and acrylate rubbers, is that they may deleteriously affect the physical and/or thermal properties, as well as the chemical and flame resistance of the poly(arylene sulfide) resins into which they are incorporated.

Polyorganosiloxanes, which exhibit superior high temperature properties and greater chemical and flame resistance compared to many olefin and acrylate based rubbers, have been suggested as possible modifiers to improve the impact resistance of poly(arylene sulfide)s. For example, U.S. Pat. No. 4,450,266 to Idel et al. describes compositions comprising blends of p-poly(phenylene sulfide) and poly (methyl-H-siloxane). Similarly, U.S. Pat. No. 3,929,708 to Brady et al. discloses blends of poly(arylene sulfide)s with one or more silicon fluids such as dimethylpolysiloxane, diethylpolysiloxane, dibutylpolysiloxane, dihexylpolysiloxane, dicyclohexylpolysiloxane, diphenylpolysiloxane, methylethylpolysiloxane, phenylmethylpolysiloxane, and cyclopentylpropylpolysiloxane.

Silicone rubbers have also been suggested for use as impact modifiers in poly(arylene sulfide)s. See, for example, U.S. Pat. No. 4,581,411 to Liang et al., disclosing the use of a hydroxy terminated diarylsilane/dialkylsilane rubber as an impact modifier in poly(phenylene sulfide)s; and. European Patent Application No. 0 369 245, disclosing compositions comprising blends of poly(arylene sulfide) resin and a polyorganosiloxane graft copolymer prepared by grafting a vinyl monomer onto a polyorganosiloxane rubber having an average particle size in a range of 0.15 µm to 0.5 µm. European Patent Application No. 0 369 245 suggests that the grafting of reactive functionality onto a polysiloxane rubber provides a means of improving the compatibility of the rubber with the poly(arylene sulfide), thereby increasing the impact resistance of the resultant resins.

The use of silicone rubbers in conjunction with certain silanes in poly(arylene sulfide) resins has also been described. See, for example, U.S. Pat. No. 5,071,907 to Nakata et al. and European Patent Application Publication No. 0 369 244 to Yamamoto et al., both assigned to Mitsubishi Rayon Co., Ltd., describing polyarylene sulfide resin compositions containing (A) 99 to 60 parts by weight of poly(arylene sulfide), (B) 1 to 40 parts by weight of a polyorganosiloxane rubber having a particle size of 0.1 µm to 0.5 µm, (C) 0.01 to 10 parts by weight, based on 100 parts by weight of the total of (A) and (B) of a functionalized organosilane compound and, optionally, (D) filler. The rubber component of Yamamoto et al. and Nakata et al. is described as a polyorganosiloxane having a polyorganosiloxane and crosslinkable component. As a cross-linking agent, monomers such as tri- or tetrafunctional siloxanes are suggested. Additionally, the use of silane additives in poly (phenylene sulfide) resins containing hydroxyl terminated diarylsilane/dialkylsilane copolymer is disclosed by the above referenced patent to Liang et al.

In the case of U.S. Pat. No. 5,071,907, the functionalized organosilane component (C) is characterized as having an isocyanate group bonded to at least one alkyl group which, in turn, is bonded to a silicon atom of the organosilane. In the case of European Patent Application No. 0 369 244, the organosilane (C) is characterized as having at least one epoxy group and at least one alkoxy group bonded directly to a silicon atom thereof. The described organosilanes are said to react with the poly(arylene sulfide) resin and the polyorganosiloxane rubber and, thus, are believed to function as compatibilizers.

The resin compositions of the above cited Mitsubishi Rayon references are prepared by dispersing a powdery poly(arylene sulfide) in an aqueous emulsion of the polyorganosiloxane, coagulating the resulting dispersion, recovering poly(arylene sulfide) particles in which the polyorganosiloxane is dispersed, combining the recovered poly (arylene sulfide) with the polyorganosiloxane and extruding the resultant composition to form the described resin. This technique for incorporating the polyorganosiloxane into the poly(arylene sulfide) component is described as providing enhanced impact resistance compared to simple melt blending of the various resin components which is characterized as yielding a non-uniform dispersion of rubber in the polymer matrix. The silicone rubbers exemplified in these references not being ordinarily melt-dispersable in poly (arylene sulfide), the aqueous dispersion techniques employed therein offer a means of reducing the agglomeration that might otherwise occur if the rubber component were to be incorporated into the polymer matrix during melt blending. Non-uniform rubber dispersion, together with the relative incompatibility of the rubber with the polymer matrix, is suggested to be the cause of inadequate impact enhancement.

The Mitsubishi Rayon references require that the polyorganosiloxane component be of a relatively fine particle size (i.e., in a range of 0.1 µm to 0.5 µm). The Mitsubishi references state that "when the average particle size is less than 0.1 µm or more than 0.5 µm impact resistance is not sufficiently exhibited" suggesting that there is a direct correlation between particle size and impact resistance. These references suggest that with particles of such a small size, the described preparative techniques would be expected to result in a more uniform dispersion of the polyorganosiloxane rubber than might otherwise be obtained vis-a-vis melt compounding. Compared to simple melt blending, however, the process described by the Mitsubishi Rayon applications is a complex procedure which is both time consuming and costly.

The disclosures of the above referenced patents and applications notwithstanding, it has been found that ductility (as measured by the physical properties of finished articles produced from such resins and/or the characteristics of the resins in the melt) is widely variable depending upon the particular silicon-containing additives incorporated therein. Thus, there remains a need for poly(arylene sulfide) resins having desirable ductility, particularly, resins which can be formed by relatively simple processing techniques.

It is an object of this invention to provide poly(arylene sulfide) resins which exhibit ductility in the melt and, in certain embodiments, good impact in finished articles. It is a further object of this invention to provide impact resistant poly(arylene sulfide) resins capable of producing molded or extruded articles having both good impact and elongation. It is yet another object of this invention to provide poly (phenylene sulfide) resins suitable for use in the production of extruded, drawn or spun articles, in particular, fibers, filaments, films and coatings.

SUMMARY OF THE INVENTION

In one embodiment there is provided a resin composition which comprises:

- (A) from about 99.5 to about 70 percent by weight, based on the total weight of components (A) and (B), of a poly(arylene sulfide) having a melt viscosity of from about 300 to about 8,000 poise as measured at 1,200 sec$^{-1}$ and 310° C.;
- (B) from about 0.5 to about 30 percent by weight, based on the total weight of components (A) and (B) of a substantially non-functionalized, emulsion cured silicone rubber which is the condensation product of (i) an organopolysiloxane having at least two active hydrogen functional groups per molecule and (ii) an organohydrogenpolysiloxane having at least two silicon-bonded hydrogen atoms per molecule, said silicone rubber being melt dispersable with the poly(arylene sulfide); and
- (C) from about 0.1 to about 2.0 parts by weight, based on 100 parts by weight of components A, B and C combined, of an aminosilane, wherein said composition has been produced by combining components B and C with component A in the absence of a dispersion medium.

In a further embodiment, this invention relates to a process for producing a poly(arylene sulfide) resin which comprises the steps of:

(1) combining in the absence of a dispersion medium:
- (A) from about 99.5 to about 70 percent by weight, based on the total weight of components (A) and (B), of a poly(arylene sulfide) having a melt viscosity of from about 300 to about 8,000 poise as measured at 1,200 sec$^{-1}$ and 310° C.;
- (B) from about 0.5 to about 30 percent by weight, based on the total weight of components (A) and (B) of a substantially non-functionalized, emulsion cured silicone rubber which is the condensation product of (i) an organopolysiloxane having at least two active hydrogen functional groups per molecule and (ii) an organohydrogenpolysiloxane having at least two silicon-bonded hydrogen atoms per molecule, said silicone rubber being melt dispersable with the poly(arylene sulfide), to form a blend of poly(arylene) sulfide and silicone rubber;

(2) introducing into the blend of step 1 an aminosilane in an amount of from about 0.1 to about 2.0 parts by weight, based on 100 parts by weight of component (A), component (B), and the organosilane combined; and (3) melt extruding the blend of step 2.

DETAILED DESCRIPTION OF THE INVENTION

The poly(arylene sulfide) ("PAS") component of this invention is a polymer consisting essentially of repeating units of the formula:

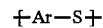

wherein Ar for an individual repeating unit is a divalent radical selected from the group consisting of:

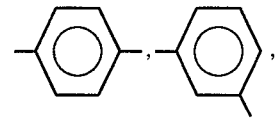

and

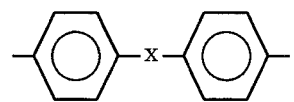

wherein X is a divalent radical selected from the group consisting of —SO$_2$—, —C(O)—, —O—, —C$_a$H$_{2a}$—, and —C(CH$_3$)$_2$— wherein a is an integer having a value of 0 to 3. Additionally, the aromatic rings of the individual radicals Ar may be optionally substituted by 1 to 3 substituents selected from the group consisting of alkyl groups having up to 4 carbon atoms, and fluorine, chlorine and bromine radicals. For purposes of this invention unsubstituted polymers are of particular interest. Mixtures of two or more different poly(arylene sulfide)s are also suitable for use herein.

The poly(arylene sulfides) used herein and their method of preparation are well known in the art and are described, for example, in U.S. Pat. Nos. 3,354,127; 4,645,826; and 4,645,826; all of which are incorporated herein by reference. In general, such poly(arylene sulfide)s are prepared by the reaction of an alkali metal sulfide and a dihalo-aromatic compound. Depending upon the particular method of preparation, the poly(arylene sulfide) may exist as random or block homopolymers or copolymers.

The poly(arylene sulfide) may be a linear or branched polymer having a melt viscosity of from about 300 to about 8,000 poise, preferably from about 1,000 to about 5,000 poise at 1,200 sec$^{-1}$ and 310° C. Substantially linear polymers are of particular interest. The viscosity of the polymer will be dependent in part on the molecular weight thereof and the extent to which it is crosslinked ("cured"). Both uncured or partially cured polymers are suitable for use herein. Curing of the poly(arylene sulfide) may be accomplished by thermal and/or solvent treatments such as are known in the art.

Poly(arylene sulfide)s of particular interest include high viscosity polymers as disclosed in U.S. Pat. No. 4,645,826, incorporated herein by reference, having viscosities which are within the useful range described above. As disclosed therein, a linear PAS can be readily produced by forming a PAS prepolymer of low to medium molecular weight according to a preliminary polymerization, then elevating the temperature by heating the polymerization system under strongly alkaline conditions with addition of a phase separating agent to the polymerization system, thereby separating the system into two liquid phases, i.e., a high viscosity phase (polymer solution phase) and a low viscosity phase (solvent phase), and carrying out the reaction under such a state.

The two-phase separated polymerization comprises dissolving a low viscosity arylene sulfide prepolymer, in a poor solvent, i.e., water, under a strongly alkaline condition (in a pH range of from 9.5 to 14 of the reaction mixture when diluted 10-fold with water) in a temperature range of from 245° C. to 290° C. into a liquid-liquid two-phase separated state and maintaining this state for 1 to 50 hours to convert the arylene sulfide prepolymer into a high molecular weight polymer, then separating the polymer from the polymerization system and purifying the polymer after neutralization.

The process for production of a high to ultra-high molecular weight PAS according to U.S. Pat. No. 4,645,826 comprises, in general, forming PAS molecules through bonding between an alkali metal sulfide and a dihalo-aromatic compound and/or converting the PAS molecules into a high molecular weight polymer. PPS having melt viscosities of at least 1,000 poise at 1,200 sec$^{-1}$ can be produced by the process as disclosed therein.

The starting materials for producing the prepolymer comprise an alkali metal sulfide, a dihalo-aromatic compound and a polymerization solvent. The alkali metal sulfide includes lithium sulfide, sodium sulfide, potassium sulfide, rubidium sulfide, cesium sulfide and mixtures thereof. These alkali metal sulfides can be used as hydrates or aqueous mixtures, or in anhydrous forms. Among these alkali sulfides, sodium sulfide is the least expensive and is commercially preferred. It is also possible to use a small amount of an alkali metal hydroxide in combination therewith in order to neutralize an acidic salt (e.g., alkali metal disulfides and alkali metal bicarbonates) which may sometimes occur in minute amount in the alkali metal sulfide.

The dihalo-aromatic compound used includes any of the dihalo-aromatic compounds as disclosed in Japanese Laid-open Patent Publication No. 22926/1984. Particularly preferred are p-dichlorobenzene, m-dichlorobenzene, 2,5-dichlorotoluene, 2,5-dichloro-p-xylene, p-dibromobenzene, 1,4-dichloronaphthalene, 1-methoxy-2,5-dichlorobenzene, 4,4'-dichlorobiphenyl-3,5-dichlorobenzoic acid, p,p'-dichlorodiphenylether, p,p'-dichlorodiphenylsulfone, p,p'-dichlorodiphenylsulfoxide, p,p'-dichlorodiphenylketone, and the like. Among these, those composed mainly of paradihalobenzene, typically p-dichlorobenzene, are especially preferred.

By appropriate selection and combination of dihaloaromatic compounds, a random or block copolymer containing two or more different reaction units can be obtained. For example, when employing p-dichlorobenzene in combination with m-dichlorobenzene or p,p'-dichlorodiphenylsulfone, a random or block copolymer containing:

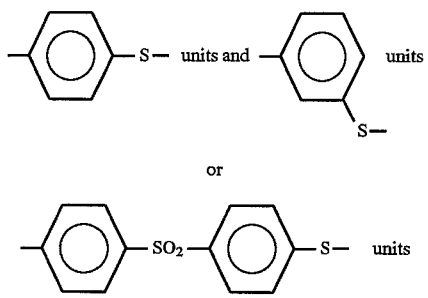

can be obtained. Further, a small amount of a polyhaloaromatic compound (e.g., trichlorobenzene) within the range which may provide some cross-linking but not substantially impair linearity may also be employed in combination, but no such compound is ordinarily required.

An organic amide solvent which is used in the polymerization step can be used for forming the prepolymer and can be selected from N-methylpyrrolidone (NMP); N-ethylpyrrolidone; N,N'-dimethylformamide; N,N'-dimethylacetamide; N-methylcaprolactam; tetramethylurea; hexamethylphosphorotriamide; and mixtures thereof. Among these, N-methylpyrrolidone is particularly preferred from viewpoints such as chemical stability and the ability to produce readily a high molecular weight polymer. The organic amide as the polymerization solvent is desirably an aprotic compound. In the polymerization step for forming an ultra-high molecular linear polymer from the prepolymer, the above organic amide can of course be used. Otherwise, it is also possible to employ, for example, aromatic hydrocarbons ($C_6$–$C_{30}$), aliphatic hydrocarbons ($C_6$–$C_{30}$), ethers ($C_6$–$C_{30}$), ketones ($C_5$–$C_{30}$), pyridine or quinoline or derivatives of these ($C_5$–$C_{30}$), and mixtures thereof as such or as mixtures with organic amides.

In practicing the process, first, an alkali metal sulfide and a dihalo-aromatic compound are added into an organic solvent, desirably under an inert gas atmosphere, and the temperature is elevated to a desired temperature at which the reaction is carried out. Here, if the water content in the alkali metal sulfide is less than the desired content, the necessary amount of water is added for supplementation.

The preliminary polymerization is preferably conducted at a temperature in the range of from 160° to 260° C., particularly from 180° to 235° C. At a temperature lower than 160° C., the reaction rate may be extremely slow, while at a temperature over 260° C., the PAS formed is liable to be decomposed to produce only a PAS with extremely low melt viscosity.

The end point of the preliminary polymerization step and the timing of turning from the preliminary polymerization to the two-phase separate polymerization, is preferably the point when the conversion of the dihalo-aromatic compound has reached 70 mole % to 98 mole %.

At the point of turning from the preliminary polymerization to the two-phase separated polymerization, the melt viscosity of the PAS is preferably in the range of from 5 to 300 poise (at 310° C. and a shearing rate of 200 sec$^{-1}$). The range of from 10 poise to 200 poise is more suited for obtaining a PAS of a high polymerization. With a viscosity less than 5 poise, formation of two-phase separation is insufficient, whereby decomposition of the polymerization system or lowering of the reaction rate will readily occur. With a viscosity over 300 poise, harmful substances which will promote polymer cleavage will be accumulated in greater amount, whereby a lowering in polymer yield and decomposition of the polymer system will undesirably be caused.

The polymerization process as described in U.S. Pat. No. 4,645,826 is applicable for not only homopolymerization or random copolymerization but also for block copolymerization. For example, a purified p-phenylene prepolymer and a purified m-phenylene prepolymer can be dispersed in the same polymerization vessel to carry out the two-phase separated polymerization step, whereby a p-phenylenesulfide-m-phenylene sulfide block copolymer can readily be obtained.

Because of its availability and desirable properties such as high chemical resistance, nonflammability, and high strength and hardness, poly(phenylene sulfide) is the presently preferred poly(arylene sulfide). Poly(phenylene sulfide) is available from a variety of sources including Hoechst Celanese Corporation, Phillips Petroleum Corporation, and Bayer Aktiengesellschaft.

The silicone rubber of this invention is the emulsion condensation product of an organopolysiloxane having at least two active hydrogen-containing functional groups per molecule ("Polysiloxane A") and an organohydrogenpolysiloxane having at least two silicon-bonded hydrogen atoms per molecule ("Polysiloxane B"). Desirably, the silicone rubber, prior to melt compounding, is in the form of spherical particles having an average particle diameter of from about 0.5 µm to about 100 µm. Silicone rubbers having a pre-melt compounding particle size of from about 1 µm to about 10 µm are of particular interest. During compounding, the rubber component of the subject compositions becomes melt dispersed within the resin matrix. It has been found that, after melt compounding, the average particle size of the silicone rubber utilized in the practice of this invention is typically from about 0.5 to about 5µm. Without wishing to be bound to theory, it is believed that the relatively low cross-link density of the rubber used herein compared, for example, to polysiloxanes which have been cross-linked by monomeric cross-linking agents such as trialkoxysilanes or tetraalkoxysilanes leads to greater dispersibility of the rubber in the resin matrix.

The silicone rubber used herein is a substantially non-functionalized rubber. The term "non-functionalized rubber" as used herein means a rubber, the only functionally reactive groups of which are unreacted sites provided by the silicon-bonded hydrogen atoms of Polysiloxane B and the active hydrogen-containing groups of Polysiloxane A. In the context of the subject invention, "substantially non-functionalized rubber" denotes a non-functionalized rubber or a rubber which, notwithstanding the presence of minor amounts of additional functionality, behaves like a non-functionalized rubber when incorporated into the subject melt blends. Thus, additional functionality is permitted, provided that it does not otherwise alter the chemical reactivity or cross-link density of the rubber in a manner such that the benefits otherwise provided by the use thereof in the subject compositions are lost.

Polysiloxane A is a straight or slightly branched polymer the active hydrogen-containing functional groups of which are preferably located at terminal sites of the polymer. The preferred active hydrogen-containing functional groups are hydroxyl, however, in certain instances other active hydrogen containing functional groups, e.g., thiol, may be used. Illustrative of Polysiloxane A are methylphenylsiloxane/dimethylsiloxane copolymers and dimethylpolysiloxanes homopolymers having terminal hydroxyl groups at both ends of the molecular chain. Desirably, Polysiloxane A should have a molecular weight of at least about 3,000. Optionally, Polysiloxane A may be substituted at one or more of its silicon atoms by non-reactive monovalent radicals such as, for example, alkyl radicals having up to 4 carbon atoms, aryl radicals such as phenyl, aralkyl radicals such as benzyl, cycloalkyl radicals such as cyclopentyl and cyclohexyl, and the like.

Polysiloxane B includes the following: trimethylsiloxy-terminated methylhydrogenpolysiloxanes; trimethylsiloxy-terminated dimethylsiloxane-methylhydrogensiloxane copolymers; methylhydrogen-siloxy-terminated dimethylsiloxane-methylhydrogensiloxane copolymers; dimethylsiloxane-methylhydrogensiloxane cyclic copolymers; copolymers composed of $(CH_3)_2HSiO_{1/2}$ units and $SiO_{4/2}$ units; and copolymers composed of $(CH_3)_3SiO_{1/2}$ units, $(CH_3)_2HSiO_{1/2}$ units and $SiO_{4/2}$ units. Desirably, Polysiloxane B has a viscosity of from about 1 to about 50,000 Pa.S, preferably from about 1 to about 1,000 Pa.S at 25° C. The silicon-bonded hydrogen content of Polysiloxane B should not exceed 1 percent by weight since excess amounts of silicon-bonded hydrogen can result in processing difficulties as well as deterioration of the physical properties of the cured rubbers. Optionally, Polysiloxane B may be substituted at one or more of its silicon atoms by non-reactive monovalent radicals such as are described above in the context of substitution of the silicon atoms of Polysiloxane A.

The silicone rubbers of this invention are prepared by the condensation of Polysiloxane A and Polysiloxane B in the presence of a sufficient amount of curing catalyst to cause reaction between the silicon-bonded hydrogen atoms of Polysiloxane B and the active hydrogen containing groups of Polysiloxane A. In producing the subject silicone rubbers, Polysiloxane B is utilized in an amount such as to cause essentially complete reaction of the active hydrogen containing groups of Polysiloxane A. Utilization of from 0.1 to 50 parts by weight of Polysiloxane B per 100 parts by weight of Polysiloxane A is typical and depends, in part, on the amount of silicon-bonded hydrogen present in Polysiloxane B.

Suitable curing catalyst include tin, titanate or platinum containing catalysts. For example, organic acid metal salts such as dibutyltin dilaurate, dibutyltin diacetate, stannous octoate, dibutyltin dioctoate, stannous laurate, and iron(II) stannoctenate; titanium acid esters such as tetrabutyl titanate, tetrapropylene titanate and dibutoxytitanium bis (ethylacetoacetate); platinum compounds such as chloroplatinic acid; as well as platinum metal and platinum black. Tin containing catalysts are of particular interest.

The catalyst may be utilized in finely divided powder form or as a solution or complex. The form of the catalyst will depend, in large part, on the particular catalyst selected. In the case of platinum metal, the catalyst is commonly added in finely divided form on a suitable carrier; in contrast, chloroplatanic acid may be added in powder form, dissolved in suitable solvent, or as a complex with other materials, for example olefins, alkenylsiloxanes, diketones, and the like.

When using organic acid metal salts and titanium acids, an amount of catalyst of from about 0.01 to about 5.0, preferably from about 0.05 to about 2.0, parts by weight per 100 parts of Polysiloxane A will be used. Platinum catalysts, however, are generally used in amounts of from about 0.1 to about 1,000, preferably from about 1 to 100, parts by weight of platinum metal per 1,000,000 parts by weight of Polyorganosiloxane A and Polyorganosiloxane B combined.

The silicone rubbers are prepared by creating a homogeneous aqueous dispersion of Polysiloxane A, Polysiloxane B and catalyst which is brought into contact with a gas or liquid of higher temperature (herein referred to as the "curing medium") to effect curing of the polysiloxane components. Silicone rubbers so prepared are herein referred to as being "emulsion cured". The dispersed phase should be in finely divided form, accordingly, the use of a colloid mill or homogenizer may be desirable. The dispersion may also contain relatively small amounts of surfactant. Surfactant assists in maintaining the dispersed phase in the form of regularly shaped discrete spheres. The surfactant should not, however, react with either of the polysiloxane reactants.

The curing medium includes liquids such as liquid paraffin, water, dimethylsilicone oils, phthalate esters and the like as well as non-flammable gases such as nitrogen and air. Water is the preferred liquid curing medium. When contacting the dispersion with the curing medium it is essential that the discrete spherical form of the dispersed phase be maintained. Thus, when the curing medium is a liquid, the dispersion will be brought into contact with the liquid curing medium in metered fashion with vigorous agitation followed by separation of the cured rubber; when the curing medium is a gas, the dispersion will be sprayed into the high temperature gas as finely atomized droplets.

The preparation of emulsion cured silicone rubbers is set forth in greater detail in U.S. Pat. No. 4,849,564, which exemplifies the production of both functionalized and non-functionalized rubbers and is incorporated herein by reference with respect to its preparation of non-functionalized rubbers. Emulsion polymerized rubbers are commercially available from Dow Corning Corporation, with the product sold under the designation Trefil E600 being of particular interest.

The silicone rubbers are typically present in the compositions of this invention in amounts of from about 0.5 to about 30 percent by weight, based on the total weight of the poly(arylene sulfide) and silicone rubber components. The presence of in excess of 30 percent by weight of silicone rubber may lead to off-gassing and processing difficulties as well as undesirable reductions in tensile strength. The use of less than about 0.5 percent by weight of rubber may fail to provide the desired improvements in ductility.

When improved impact of molded and extruded articles is sought, it is desirable to utilize the silicone rubber in an amount of at least about 5 percent by weight, preferably from 7 to about 15 percent by weight, based on the total weight of the poly(arylene sulfide) and silicone rubber components. Improved melt ductility, however, may be obtained utilizing silicone rubber in amounts which are as low as about 0.05 percent by weight based on the total weight of the poly(arylene sulfide) and silicone rubber components. For the improved production of extruded or drawn articles such as fibers, filaments, films and coatings, the silicone rubber may be used in amounts of from about 0.5 to about 10 percent by weight based on the total weight of the poly(arylene sulfide) and silicone rubber components.

The aminosilanes suitable for use herein are represented by the formula:

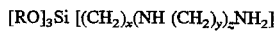

[RO]$_3$Si [(CH$_2$)$_x$(NH (CH$_2$)$_y$)$_z$NH$_2$]

wherein R represents an alkyl group having 1 to 4, preferably 1 to 2 carbon atoms, x is an integer having a value of 1 to 4, preferably 1 to 3, y is an integer having a value of 1 to 4, preferably 1 to 2, and z is an integer having a value from 0 to 2, preferably 0 to 2.

Included in the aminosilanes described above are gamma-aminopropyltrimethoxysilane; gamma-aminopropyltriethoxysilane; N-beta(aminoethyl)-gamma-aminopropyltrimethoxysilane; and trifunctional silanes of the formula:

H$_2$NCH$_2$CH$_2$NHCH$_2$CH$_2$NHCH$_2$CH$_2$CH$_2$Si(OCH$_3$)$_3$.

The aminosilane is present in the compositions of this invention in an amount of from about 0.01 to about 2.0 parts by weight, preferably from about 0.1 to about 0.7 parts by weight, based on 100 parts by weight of the poly(arylene sulfide), silicone rubber and aminosilane components combined. Less than about 0.01 parts by weight of aminosilane may not provide the desired property results, whereas, in excess of 2.0 parts by weight of aminosilane can result in excessive viscosity build-up and off-gassing.

The preparation of aminosilanes is well known in the art. See, for example, U.S. Pat. No. 2,723,987, C. Eaborn, *Organosilicon Compounds*, Butterworth, London (1960); W. Noll, *Chemistry and Technology of Silicones*, Academic, NY (1968); and L. M. Shorr, *J. Am. Chem. Soc.*, 76, 1390 (1954) (which are all incorporated herein by reference). Aminosilanes suitable for use herein are widely available from a variety of manufacturers including Dow Corning Corporation and Union Carbide Corporation.

Without wishing to be bound to any particular theory, it is believed that the aminosilane functions as a type of compatibilizer between the silicone rubber and poly(arylene sulfide) components of the compositions of this invention. Moreover, it has been found that poly(arylene sulfide) resins lacking an aminosilane additive and containing a functionalized silicone rubber have different impact and elongation characteristics compared to poly(arylene sulfide) resins containing a non-functionalized silicone rubber and an aminosilane. It is postulated that the aminosilane, non-functionalized silicone rubber, and poly(arylene sulfide) components herein described may undergo a reaction in the melt which is different from the reaction between a poly(arylene sulfide) and a functionalized silicone rubber. Irrespective of whether the differences in the melt dynamics of this invention result from the method and/or extent of compatibilization, the effect on physical properties can be striking.

Additionally, silane modified poly(arylene sulfide) s containing non-functionalized rubbers may exhibit different physical properties and processability characteristics when the non-functionalized rubbers are produced by different synthetic mechanisms (for example, hydrosilation as opposed to condensation). These differences in physical properties for otherwise chemically identical rubbers also suggest differences in the mechanism of component interaction.

The compositions of this invention can be prepared by conventional melt blending techniques wherein the poly(arylene sulfide), silicone rubber and aminosilane components are combined under conditions of elevated temperature and shear without having to first incorporate the rubber into the poly(arylene sulfide) by aqueous dispersion techniques. Thus, in the practice of this invention, the rubber and poly(arylene sulfide) components are combined in the absence of a dispersion medium. For processing convenience, the various components may be tumble-blended or otherwise pre-mixed in a dry state prior to melt extrusion. The order in which the components are combined is not critical, thus various components can be combined in a single or multiple step(s).

Desirable melt blends are generally prepared by co-extrusion of the resin components at a temperature of up to about to 340° C. For purposes of this invention, preferred melt temperatures are from about 240° C. to about 340° C., with compositions containing higher viscosity poly(arylene sulfide) components being extruded at higher temperatures within this range than compositions containing lower viscosity poly(arylene sulfide) components. Within this described temperature range, the use of a non-functionalized silicone rubber as herein described permits the use of higher extrusion temperatures than might otherwise be employed utilizing a functionalized silicone rubber, which may be prone to off-gassing and other processing difficulties in the melt. Depending upon the particular components utilized and their relative amounts, the use of melt temperatures in excess of 340° C. can result in deterioration of the physical properties of the resultant compositions. The compositions of this invention are useful in the production of a variety of molded and extruded articles. Compositions which exhibit a relatively high degree of ductility in the melt are useful in the production of film, sheet, fiber and monofilament. Additionally, the compositions of this invention may be used as an encapsulant or coating.

Depending on the objects being formed and the processing techniques employed, the compositions of this invention may further comprise one or more optional additives such as, for example, fillers, antioxidants, heat stabilizers, ultraviolet stabilizers, mold release agents, lubricants, plasticizers, flame retardants, pigments, and the like. The total amount of all such optional additives, exclusive of filler, typically will not exceed about 5 percent of the total weight of the composition and oftentimes will not exceed about 2 percent of the total weight of the composition. It should be noted that filler, when present, will typically account for up to about 65 percent of the compositions' total weight. The optional additives may be incorporated by a variety of techniques which combine the additives with the melt blend in a substantially uniform manner; extrusion compounding being preferred.

In a preferred embodiment the compositions of this invention consist essentially of:

(A) from about 85 to about 93 percent by weight, based on the total weight of components (A) and (B) of a poly(phenylene sulfide) having a melt viscosity of from about 1,000 to about 5,000 poise at 1,200 sec$^{-1}$ and 310° C.;

(B) from 15 to about 7 percent by weight, based on the total weight of components (A) and (B) of a substantially non-functionalized, emulsion cured silicone rubber which is the reaction product of a dimethylpolysiloxane homopolymer having terminal hydroxyl groups at both ends of its molecular chain and a trimethylsiloxy-terminated methylhydrogenpolysiloxaneorganopolysiloxane having at least two terminal active hydrogen functional groups per molecule, wherein the silicone rubber has an average particle size of from about 1 µm to about 10 µm prior to incorporation into the compositions of this invention; and (C) from about 0.1 to about 0.7 parts by weight per 100 parts by weight of components (A), (B) and (C) combined of an aminosilane of the formula:

$$[RO]_3Si[(CH_2)_3NH_2]$$

wherein R represents an alkyl group having 1 to 2 carbon atoms, wherein said composition has been prepared by combining components B and C with component A in the absence of a dispersion medium.

EXAMPLES

The following examples are presented to further illustrate this invention. The examples are not, however, intended to limit the invention in any way. The tests hereinafter described were performed on samples molded from compositions prepared in accordance with the examples. Unless otherwise indicated, all parts and percentages are by weight based on total composition weight.

Izod impact (notched and unnotched) was measured pursuant to ASTM method D-256. Tensile strength and elongation were measured pursuant to ASTM method D-638. Instrumental impact (RDT) was measured pursuant to ASTM method D-3763-85 utilizing a ⅛" thick disk 2" in diameter, and a 33 lb. dart having a fall rate of 8200 meters/sec.

EXAMPLE I

Compositions as described in Tables 1 and 2 were compounded by mixing the components in the described proportions and melt blending the resulting mixtures on a Haake conical twin screw extruder (System 90) to produce an extrudate which was cooled and pelletized. Prior to mixing the poly(phenylene sulfide) and silicone rubber components were dried overnight at temperatures of 120° C. and 60° C., respectively. Extrusion conditions were as follows:

melt temperature: 290° to 310° C.

die temperature: 290° to 310 ° C.;

screw speed: 60 rpm.

TABLE 1

| Component, Weight % | COMPOSITION | | | | | | | | | |
|---|---|---|---|---|---|---|---|---|---|---|
| | $C_1$ | $C_2$ | $C_3$ | $E_1$ | $C_4$ | $C_5$ | $C_6$ | $C_7$ | $E_2$ | $C_8$ |
| Fortron W 300[1] | 100 | 99.5 | 80 | 79.5 | 80 | 79.5 | 80 | 79.5 | 89.5 | 89.5 |
| Trefil E600[2] | — | — | 20 | 20 | — | — | — | — | 10 | — |
| Trefil E601[3] | — | — | — | — | 20 | 20 | — | — | — | 10 |
| Trefil E602[4] | — | — | — | — | — | — | 20 | 20 | — | — |
| A-1100[5] | — | 0.5 | — | 0.5 | — | 0.5 | — | 0.5 | 0.5 | 0.5 |

[1]Poly(phenylene sulfide) resin available from Hoechst Celanese Corporation having a melt viscosity of 3,000 poise at 1,200 sec$^{-1}$ and 310° C.
[2]An emulsion cured polydimethylorganosiloxane rubber, available from Dow Corning Corporation, having an average particle diameter of about 5 µm.
[3]An emulsion cured silicone rubber having epoxy functionality, available from Dow Corning Corporation, having an average particle diameter of about 5 µm.
[4]An emulsion cured silicone rubber having amino functionality, available from Dow Corning Corporation, having an average particle diameter of about 5 µm.
[5]Gamma-aminopropyltriethoxysilane, available from Union Carbide Corporation.

TABLE 2

| Component, Weight % | COMPOSITION | | | | |
|---|---|---|---|---|---|
| | $C_9$ | $C_{10}$ | $C_{11}$ | $C_{12}$ | $C_{13}$ |
| Fortron W 300 | 89.5 | 89.5 | 89.5 | 90.0 | 89.5 |
| Trefil E600 | — | 10 | — | — | — |
| Trefil E601 | 10 | — | — | 10 | — |
| Trefil E602 | — | — | 10 | — | — |
| Ground Silicone Rubber[1] | — | — | — | — | 10 |
| A-186[2] | 0.5 | 0.5 | 0.5 | — | — |
| A-1100 | — | — | — | — | 0.5 |

[1]Polymethylsiloxane rubber available from Dow Corning Corporation, ground to particles having an average diameter of 60–70 µm.
[2]Beta-(3,4-epoxycyclohexyl)ethyltrimethoxysilane, available from Union Carbide Corporation.

The pelletized melt blends were molded on a Boy 22S molding machine into ASTM test specimens 1/8" thick. Prior to molding the melt blends were dried overnight at 110° C. Conditions during molding were as follows:

melt temperature: 310° C.
mold temperature: 80° C.
cycle time: 30 sec
screw speed: 110 rpm The tensile strength, elongation, Izod and instrumental impact (as measured by total RDT Energy data) properties of the molded test samples are provided in Table 3.

TABLE 3

| Composition | Tensile Strength At Yield (psi) | Elongation At Break (%) | Notched Izod (ft-lb/in) | Un-notched Izod (ft-lb/in) | Total RDT Energy (in-lb) |
|---|---|---|---|---|---|
| $C_1$ | 8440 | 130 | 0.5 | 37 | 335 |
| $C_2$ | 8990 | 20 | 0.4 | 34 | — |
| $C_3$ | 4960 | 32 | 0.6 | 25 | 30 |
| $C_4$ | 5070 | 150 | 6.8 | 29 | 250 |
| $C_5$ | 4850 | 110 | 6.8 | 28 | 230 |
| $C_6$ | 4715 | 30 | 0.3 | 26 | 100 |
| $C_7$ | 4490 | 40 | 0.5 | 28 | 140 |
| $C_8$ | 6495 | 180 | 11.0 | — | 300 |
| $C_9$ | 8710 | 81 | 15.6 | — | 325 |
| $C_{10}$ (run 1) | 8430 | 62 | 14.7 | — | 370 |
| $C_{10}$ (run 2) | 8170 | 37 | 13.8 | — | 306 |
| $C_{11}$ | 8100 | 55 | 0.9 | — | 280 |
| $C_{12}$ | 6840 | 16 | 1.1 | — | 250 |
| $C_{13}$ | 6450 | 7 | 1.3 | — | 62 |
| $E_1$ | 4970 | 150 | 7.6 | 29 | 120 |
| $E_2$ (run 1) | 6470 | 190 | 15.0 | 40 | 320 |
| $E_2$ (run 2) | 6620 | 133 | 16.7 | — | 309 |

From Tables 1, 2 and 3, it would appear that the emulsion cured silicone rubber designated as E600 provides a desirable combination of impact and elongation properties in the presence of an aminosilane additive (see $E_1$ and $E_2$). In contrast, without an aminosilane, this same rubber produced compositions having substantially lower impact and elongation properties (see $C_3$). The properties provided by the use of the emulsion cured silicone rubber E600 and an aminosilane was not matched by the use of the same aminosilane with a ground polymethylsiloxane rubber (see $C_{13}$). Comparative composition $C_{10}$ containing the E600 silicone rubber and an epoxysilane additive provided a desirable combination of tensile strength, Izod impact and instrumental impact, but had substantially lower elongation properties than $E_1$ and $E_2$. From this data, the substitution of the aminosilane additive by an epoxysilane additive in compositions such as are represented by $E_1$ and $E_2$ is expected to reduce the ductility of fabricated articles produced from such compositions. It was also observed that each of comparative compositions $C_6$, $C_7$, and $C_{11}$, containing the functionalized silicone rubber designated as E602, failed to provide the combination of good impact and elongation offered by the combination of aminosilane and the non-functionalized silicone rubber E600. Under the extrusion and molding conditions employed, compositions containing an aminosilane additive and 10% of the functionalized silicone rubber designated as E601 appeared to provide molded samples having a desirable combination of physical properties (see controls $C_4$, $C_5$, $C_8$ and $C_9$).

EXAMPLE II

The preparation of two of the Example I compositions ($E_2$ and $C_8$) was repeated utilizing a larger extruder, i.e., a 30 mm ZSK twin screw extruder, at somewhat higher processing temperatures. Additionally, a new composition $C_{14}$ containing 89.5% of the described poly(phenylene sulfide) resin (Fortron W300), 10% of Trefil (E602), and 0.5% of A-1100 aminosilane was compounded on this larger extruder. Prior to mixing, the poly(phenylene sulfide) and silicone rubber components were dried overnight at temperatures of 120° C. and 60° C. respectively. Extrusion conditions were as follows:

melt temperature: 330° to 340° C.
die temperature: 330° to 350° C.
screw speed: 75 rpm
vacuum: 25 in. of Hg.

The extrudate was cooled and pelletized. The resulting melt blends were molded into test specimens utilizing the procedures described in Example I. Physical properties for the test specimens are provided in Table 4.

TABLE 4

| Composition | Notched Izod (ft-lb/in) | RDT Total Energy (in-lb) | Tensile Strength At Yield (psi) | Elongation At Break (%) |
|---|---|---|---|---|
| $E_2$* | 15 | 275 | 6850 | 98 |
| $C_8$* | 9 | 250 | 6910 | 17 |
| $C_{14}$ | 1 | 250 | 6695 | 34 |

*Formulations of Table 1 prepared on a 30 mm ZSK twin screw extruder

From Table 4 it is apparent that molded test samples prepared from poly(phenylene sulfide) compositions containing an aminosilane and the silicone rubbers designated as E601($C_8$) and E602($C_{14}$) failed to demonstrate either the enhancement in notched Izod impact or the elongation properties otherwise obtained by the poly(phenylene sulfide) composition which contained an aminosilane and the silicone rubber designated as E600 ($E_2$). Thus, the observed property benefits of Example I for compositions containing the functionalized rubber E601 ($C_8$) were not obtained when the compositions were scaled up on a larger extruder utilizing higher processing temperatures. Additionally, off-gassing was observed when the E601 containing compositions were processed.

EXAMPLE III

Poly(phenylene sulfide) compositions containing varying amounts of a non-functionalized silicone rubber and an aminosilane were prepared by forming the formulation described as $E_2$ of Table 4 on a 30 MM twin screw extruder and letting this composition down with the described poly(phenylene sulfide) resin (Fortron W300, containing no additional aminosilane) on a Haake extruder utilizing the conditions specified in Example I. The compositions were molded and tested as set forth in Example I. Physical properties for these compositions are provided in Table 5. As seen from Table 5, under these processing conditions, notched Izod impact performance is significantly enhanced at a silicone rubber concentration of 7.5 weight percent and up, whereas, improvements in instrumental impact were noted at all concentrations of silicone rubber tested, i.e., 1 to 10 weight %. Additionally, a fiber spinnability test was performed utilizing a test apparatus consisting of a melting assembly, a filter pack, a single hole spinneret (equipped with a circular die 0.020 inch in diameter and 0.027 inch in depth), and a take-up device capable of variable speeds. During the spinning operation the melt temperature was varied by 10° C. intervals. The take-up speed was then varied until fiber breakage occurred. Spinnability test results are provided in Table 6. From Table 6 it would appear that spinnability at relatively high take-up speed could be obtained at silicone rubber concentrations as low as 1% utilizing the substantially non-functionalized rubber designated as E600. Further, at silicone rubber (E600) levels of 1%, lower melt temperatures could be effectively utilized. For comparative purposes, spinnability data for a functionalized rubber composition designated as $C_9$ (the formulation of composition $C_9$ prepared on a 30 mm ZSK extruder utilizing a melt temperature of 320° C.) is included in Table 6.

EXAMPLE IV

To compare the effects of crosslinked and uncrosslinked rubbers, poly(phenylene sulfide) compositions containing aminosilane and the crosslinked functionalized rubber E600, or an uncrosslinked, grafted polydimethyl siloxane rubber were prepared in a Haake extruder following the procedures set forth in Example I. The compositions were molded and tested as described in Example I. Additionally, the testing procedures of Example I were repeated on molded parts which had been annealed at 200° C. for 18 hours. Composition and physical testing data are provided in Tables 7 and 8 together with field emission scanning electron microscopy (SEM) observations obtained from samples taken from the center of a freeze fractured pellet. As shown by the data presented in table compositions containing the drafted, uncrosslinked polydimethyl siloxane rubber did not provide the impact resistance or elongation at break performance of composition $E_9$ which contained the crosslinked rubber designated as Trefil E600.

TABLE 5

| Composition | % Silicone Rubber (Trefil E600) | Notched Izod (ft-lb/in) | RDT Total Energy (in-lb) | Tensile Strength At Yield (psi) | Elongation At Break % |
|---|---|---|---|---|---|
| $C_1$* | 0 | 0.5 | 335 | 8450 | 130 |
| $E_3$ | 1 | 0.7 | 395 | 9050 | 35 |
| $E_4$ | 2.5 | 0.6 | 385 | 8510 | 45 |
| $E_5$ | 5.0 | 1 | 420 | 7950 | 40 |
| $E_6$ | 7.5 | 16 | 365 | 7550 | 90 |
| $E_7$ | 9.0 | 16 | 350 | 7410 | 80 |
| $E_8$ | 10.0 | 16 | 360 | 7060 | 60 |

$C_1$* was prepared as described for Example 1 and contained no aminosilane.

TABLE 7

| COMPOSITION | | | |
|---|---|---|---|
| Component, Weight % | $E_9$ | $C_{10}$ | $C_{11}$ |
| Fortron W 300 | 89.9 | 89.9 | 89.9 |
| Trefil E600 | 10.0 | — | — |
| Epoxy Grafted Polyorganosiloxane[1] | — | 10.0 | — |
| Acrylic Grafted Polyorganosiloxane[2] | — | — | 10.0 |
| A-1100 Silane | 0.1 | 0.1 | 0.1 |

[1] Uncrosslinked, silica-containing siloxane rubber having an epoxy graft, available from Dow Corning Corporation under the designation 4-7051, having an average particle diameter of about 2–3 μm.
[2] Uncrosslinked, silica-containing polydimethyl siloxane rubber having an acrylic graft, available from Dow Corning Corporation under the designation 4-7081, having an average particle diameter of about 2–3 μm.

TABLE 6

SPINNABILITY OF PPS/SILICONE RUBBER BLENDS

| Temperature | | 290° C. | 300° C. | 310° C. | 320° C. | 330° C. | 340° C. | 350° C. | 360° C. |
|---|---|---|---|---|---|---|---|---|---|
| Composition | % Silicone Rubber | | | | Maximum Take-up Speed meters/min. | | | | |
| $C_1$ | 0 | | | | | 100 | 400 | 100 | |
| $E_3$ | 1 | 400 | 400 | 600 | 350 | | | | |
| $E_4$ | 2.5 | | | 50 | 100 | 500 | 50 | | |
| $E_5$ | 5.0 | | | 100 | 200 | 400 | 300 | 200 | |
| $E_6$ | 7.5 | | | 300 | 400 | 500 | 575 | 675 | 600 |
| $E_7$ | 9.0 | | | 250 | 300 | 350 | 400 | | |
| $E_8$ | 10.0 | | | 250 | 300 | 500 | | | |
| $C_9$* | 10.0 | | 250 | 50 | NS/OG | NS/OG | NS/OG | NS/OG | |

As used in this Table, the designation NS/OG means that compositions would not spin and that off-gassing was observed.

TABLE 8

| | COMPOSITION | | | | | |
|---|---|---|---|---|---|---|
| | E9 | | C10 | | C11 | |
| PROPERTIES | as molded | annealed | as molded | annealed | as molded | annealed |
| Tensile Strength at Yield (psi) | 6,800 | 9,620 | 8,330 | 11,200 | — | 10,220 |
| Elongation at Break (%) | 74.9 | 22.6 | 6.6 | 11.3 | 2.7 | 19.9 |
| Notched Izod (ft lbs/in) | no break | 3.0 | 4.3 | 1.0 | 10.0 | 1.3 |
| SEM OBSERVATIONS | Uniformly dispersed rubber particles with broad size range with poor to some adhesion at interface | | Voids and submicron spherical particles dispersed in matrix | | Agglomerated submicron particles of irregular size and shape with poor melting of the agglomerates | |

What is claimed is:

1. A resin composition which comprises a melt blend of:
(A) from about 99.5 to about 70 percent by weight, based on the total weight of components (A) and (B), of a poly(arylene sulfide) polymer consisting essentially of repeating units of the formula —[Ar-S]— wherein Ar for an individual repeating unit is a divalent radical selected from the group consisting of:

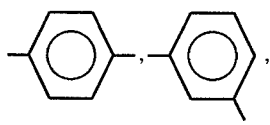

and

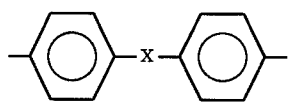

wherein X is a divalent radical selected from the group consisting of: —SO₂—, —C(O)—, —O—, —C$_a$H$_{2a}$—, and —C(CH₃)₂— wherein a is an integer having a value of 0 to 3, said poly(arylene sulfide) polymer having a melt viscosity of from about 300 to about 8,000 poise as measured at 1,200 sec⁻¹ and 310° C.;

(B) from about 0.5 to about 30 percent by weight, based on the total weight of components (A) and (B), of a substantially non-functionalized, emulsion cured silicone rubber which is the condensation product of (i) an organopolysiloxane having at least two active hydrogen functional groups per molecule and (ii) an organohydrogenpolysiloxane having at least two silicon-bonded hydrogen atoms per molecule, said silicone rubber being melt dispersable with the poly(arylene sulfide); and (C) from about 0.1 to about 2.0 parts by weight, based on 100 parts by weight of components (A), (B) and (C) combined, of an aminosilane, wherein said composition has been prepared by combining components B and C with component A in the absence of a dispersion medium.

2. A resin composition as described in claim 1 wherein the poly(arylene sulfide) is poly(phenylene sulfide).

3. A resin composition as described in claim 2 wherein the organohydrogenpolysiloxane is selected from the group consisting of trimethylsiloxy-terminated methylhydrogenpolysiloxanes; trimethylsiloxy-terminated dimethylsiloxane-methylhydrogensiloxane copolymers; methylhydrogensiloxy-terminated dimethylsiloxane-methylhydrogensiloxane copolymers; dimethylsiloxane-methylhydrogensiloxane cyclic copolymers; copolymers composed of (CH₃)₂HSiO$_{1/2}$ units and SiO$_{4/2}$ units; and copolymers composed of (CH₃)₃SiO$_{1/2}$ units, (CH₃)₂HSiO$_{1/2}$ units and SiO$_{4/2}$ units.

4. A resin composition as described in claim 3 wherein the silicone rubber is in the form of spherical particles having an average particle diameter of from about 0.5 μm to about 100 μm prior to melt blending and wherein the silicone rubber is prepared by a process which comprises the steps of:

(a) creating a homogeneous aqueous dispersion of an organopolysiloxane having at least two active hydrogen functional groups per molecule, an organohydrogenpolysiloxane having at least two silicon-bonded hydrogen atoms per molecule, and a curing catalyst;

(b) contacting the aqueous dispersion with a curing medium selected from the group consisting of higher temperature non-reactive liquids and gases to effect curing of the polysiloxane components; and (c) recovering the cured rubber.

5. A composition as described in claim 4 wherein the aminosilane is represented by the formula:

[RO]₃Si [(CH₂)$_x$(NH(CH₂)$_y$)$_z$NH₂]

wherein R represents an alkyl group having 1 to 4 carbon atoms, x is an integer having a value of 1 to 4, y is an integer having a value of 1 to 4, and z is an integer having a value from 0 to 2.

6. A composition as described in claim 5 wherein the aminosilane is selected from the group consisting of gamma-aminopropyltrimethoxysilane; gamma-aminopropyltriethoxysilane; N-beta(aminoethyl)-gamma-aminopropyltrimethoxysilane; and trifunctional silanes of the formula:

H$_2$NCH$_2$CH$_2$NHCH$_2$CH$_2$NHCH$_2$CH$_2$CH$_2$Si(OCH$_3$)$_3$.

7. A composition as described in claim 1 wherein the aminosilane is gamma-aminopropyltriethoxysilane.

8. A composition as described in claim 7 wherein the silicone rubber is the reaction product of a dimethylpolysiloxane homopolymer having terminal hydroxyl groups at both ends of its molecular chain and a siloxy-terminated methylhydrogenpolysiloxane having at least two active hydrogen functional groups per molecule.

9. A composition as described in claim 1 where then silicone rubber has an average particle diameter of from about 1 μm to about 10 μm prior to melt blending.

10. A composition as described in claim 1 wherein the silicone rubber is present in an amount of from about 5 to about 20 percent by weight, based on the total weight of components (A) and (B).

11. A composition as described in claim 1 which further comprises at least one additional component selected from the group consisting of fillers, antioxidants, heat stabilizers, ultraviolet stabilizers, mold release agents, lubricants, plasticizers, flame retardants and pigments.

12. A composition which consists essentially of a melt blend of:
  (A) from about 85 to about 93 percent by weight, based on the total weight of components (A) and (B) of a poly(phenylene sulfide) having a melt viscosity of from about 1,000 to about 5,000 poise at 1,200 sec$^{-1}$ and 310°;
  (B) from about 15 to about 7 percent by weight, based on the total weight of components (A) and (B) of a substantially non-functionalized, emulsion cured silicone rubber which is the reaction product of a dimethylpolysiloxane homopolymer having terminal hydroxyl groups at both ends of its molecular chain and a trimethylsiloxy-terminated methylhydrogenpolysiloxaneorganopolysiloxane having at least two terminal active hydrogen functional groups per molecule, wherein the silicone rubber has an average particle size of from about 1 μm to about 10 μm prior to incorporation into the composition said silicone rubber being melt dispersible with the poly(arylene sulfide); and
  (C) from about 0.1 to about 0.7 parts by weight, per 100 parts by weight of components (A), (B), and (C) combined of an aminofunctionalized silane of the formula:

[RO]$_3$Si[(CH$_2$)$_3$NH$_2$]

wherein R represents an alkyl group having 1 to 2 carbon atoms, and wherein said composition has been prepared by combining components B and C with component A in the absence of a dispersion medium.

13. A resin composition as described in claim 12 wherein the poly(phenylene sulfide) has a melt viscosity of about 1,000 poise to about 5,000 poise at 1,200 sec$^{-1}$ and 310° C.

14. A process for producing a poly(arylene sulfide) resin which comprises the steps of:
  (1) combining in a substantially anhydrous state:
    (A) from about 99.5 to about 70 percent by weight, based on the total weight of components (A) and (B), of a poly(arylene sulfide) having an melt viscosity of from about 300 to about 8,000 poise as measured at 1,200 sec$^{-1}$ and 310° C.;
    (B) from about 0.5 to about 30 percent by weight, based on the total weight of components (A) and (B), of an emulsion cured silicone rubber which is the condensation product of (i) an organopolysiloxane having at least two active hydrogen functional groups per molecule and (ii) and organohydrogenpolysiloxane having at least two silicon-bonded hydrogen atoms per molecule,
  to form a dry or melt blend of poly(arylene) sulfide and silicone rubber;
  (2) introducing into the blend of step 1 an aminosilane in an amount of from about 0.1 to about 2.0 parts by weight, based on 100 parts by weight of component (A), component (B), and the aminosilane combined; and
  (3) melt extruding the blend of step 2.

15. A film formed from a resin composition as described in claim 1 wherein the silicone rubber is present in said resin composition in an amount of from about 0.5 to about 10 percent by weight, based on the total weight of components (A) and (B).

16. A resin composition which comprises:
  (A) from about 99.5 to about 70 percent by weight, based on the total weight of components (A) and (B), of a poly(phenylene sulfide) having a melt viscosity of from about 300 to about 8,000 poise as measured at 1,200 sec$^{-1}$ and 310° C. wherein the poly(arylene sulfide) is a polymer consisting essentially of repeating units of the formula:

$$\mathrm{+Ar-S+}$$

wherein Ar for an individual repeating unit is a divalent radical selected from the group consisting of:

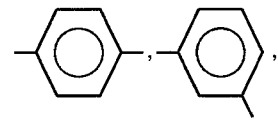

and

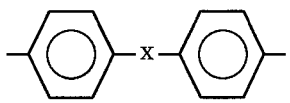

wherein X is a divalent radical selected from the group consisting of: —SO$_2$—, —C(O)—, —O—, —C$_a$H$_2$a—, and —C(CH$_3$)$_2$— wherein a is an integer having a value of 0 to 3;
  (B) from about 0.5 to about 30 percent by weight, based on the total weight of components (A) and (B), of an emulsion cured silicone rubber which is the condensation product of (i) an organopolysiloxane having at least two active hydrogen functional groups per molecule and (ii) an organohydrogenpolysiloxane having at least two silicon-bonded hydrogen atoms per molecule; and
  (C) from about 0.1 to about 2.0 parts by weight, based on 100 parts by weight of components A, B and C combined, of an aminosilane of the formula:

[RO]$_3$Si[(CH$_2$)x(NH(CH$_2$)$_y$)$_z$NH$_2$]   (I)

wherein R represents an alkyl group having 1 to 4 carbon atoms, x is an integer having a value of 1 to 4, y is an integer having a value of 1 to 4, and z is an integer having a value from 0 to 2.

17. A resin composition as described in claim 16 wherein the poly(arylene sulfide) is poly(phenylene sulfide).

18. An impact modified poly(phenylene sulfide) resin composition wherein the impact modifier thereof consists of:
   (I) a substantially non-functionalized, emulsion cured silicone rubber which is the condensation product of (I) an organopolysiloxane having at least two active hydrogen functional groups per molecule and (ii) an organohydrogenpolysiloxane having at least two silicon-bonded hydrogen atoms per molecule, and
   (II) an aminosilane
wherein said impact modifier components (I) and (II) are incorporated into the poly(phenylene sulfide) resin composition by means of melt blending.

19. A composition as described in claim 18 wherein said silicone rubber has an average particle size of from about 1 µm to about 10 µm prior to melt blending.

20. A composition as described in claim 19 wherein said silicone rubber is present in an amount of at least about 5 percent by weight based on the total weight of the poly(phenylene sulfide), silicone rubber and aminosilane combined.

21. A composition as described in claim 20 wherein said aminosilane is present in an amount of from about 0.1 to about 2.0 percent by weight based on the total weight of the poly(phenylene sulfide), silicone rubber and aminosilane combined.

* * * * *